United States Patent
Fernando et al.

(10) Patent No.: US 8,696,807 B2
(45) Date of Patent: Apr. 15, 2014

(54) CERAMIC HONEYCOMB STRUCTURE SKIN COATING

(71) Applicant: Unifrax I LLC, Niagara Falls, NY (US)

(72) Inventors: Joseph A. Fernando, Amherst, NY (US); Kenneth B. Miller, Lockport, NY (US)

(73) Assignee: Unifrax I LLC, Tonawanda, NY (US)

( * ) Notice: Subject to any disclaimer, the term of this patent is extended or adjusted under 35 U.S.C. 154(b) by 0 days.

(21) Appl. No.: 13/941,032

(22) Filed: Jul. 12, 2013

(65) Prior Publication Data

US 2013/0298798 A1    Nov. 14, 2013

Related U.S. Application Data

(63) Continuation of application No. 13/542,325, filed on Jul. 5, 2012, which is a continuation of application No. 12/633,167, filed on Dec. 8, 2009, now Pat. No. 8,263,512.

(60) Provisional application No. 61/122,583, filed on Dec. 15, 2008.

(51) Int. Cl.
  *C04B 28/26* (2006.01)
  *C09D 1/00* (2006.01)
  *C04B 35/00* (2006.01)

(52) U.S. Cl.
  USPC ............. 106/287.34; 106/286.2; 106/286.8; 501/95.2

(58) Field of Classification Search
  USPC ........ 428/116, 117, 118; 501/95.2, 95.3, 153, 501/154; 106/286.1, 286.2, 286.8
  See application file for complete search history.

(56) References Cited

U.S. PATENT DOCUMENTS

| | | |
|---|---|---|
| 2,624,658 A | 1/1953 | Parker et al. |
| 3,224,927 A | 12/1965 | Brown et al. |
| 3,649,406 A | 3/1972 | McNish |
| 3,771,967 A | 11/1973 | Nowak |
| 3,798,006 A | 3/1974 | Balluff |
| 3,916,057 A | 10/1975 | Hatch et al. |
| 3,996,145 A | 12/1976 | Hepburn |
| 4,048,363 A | 9/1977 | Langer et al. |

(Continued)

FOREIGN PATENT DOCUMENTS

| | | |
|---|---|---|
| DE | 196 38 542 A1 | 3/1997 |
| EP | 0 205 704 A1 | 12/1986 |

(Continued)

OTHER PUBLICATIONS

Gulati, Ten Eyck & Lebold. "Durable Packaging Design for Cordierite Ceramic Catalysts for Motorcycle Application" Society of Automotive Engineers Meeting, Detroit, MI, Mar. 1, 1993.

(Continued)

*Primary Examiner* — Noah Wiese
(74) *Attorney, Agent, or Firm* — Curatolo Sidoti Co., LPA; Joseph G. Curatolo; Vincent A. Cortese

(57) ABSTRACT

A porous ceramic (honeycomb) structure skin coating and a method of producing a porous ceramic structure skin coating which provides a hardshell, strong, acid- and alkali-resistant, chip-resistant ceramic honeycomb structure coating which resists pollution control catalyst from being absorbed into the skin coating.

17 Claims, 3 Drawing Sheets

(56) References Cited

U.S. PATENT DOCUMENTS

| | | |
|---|---|---|
| 4,093,423 A | 6/1978 | Neumann |
| 4,101,280 A | 7/1978 | Frietzsche et al. |
| 4,142,864 A | 3/1979 | Rosynsky et al. |
| 4,156,533 A | 5/1979 | Close et al. |
| 4,204,907 A | 5/1980 | Korklan et al. |
| 4,239,733 A | 12/1980 | Foster et al. |
| 4,269,807 A | 5/1981 | Bailey et al. |
| 4,271,228 A | 6/1981 | Foster et al. |
| 4,279,864 A | 7/1981 | Nara et al. |
| 4,305,992 A | 12/1981 | Langer et al. |
| 4,328,187 A | 5/1982 | Musall et al. |
| 4,332,852 A | 6/1982 | Korklan et al. |
| 4,335,077 A | 6/1982 | Santiago et al. |
| 4,353,872 A | 10/1982 | Midorikawa |
| 4,385,135 A | 5/1983 | Langer et al. |
| 4,617,176 A | 10/1986 | Merry |
| 4,693,338 A | 9/1987 | Clerc |
| 4,735,757 A | 4/1988 | Yamamoto et al. |
| 4,746,570 A | 5/1988 | Suzaki et al. |
| 4,752,515 A | 6/1988 | Hosoi et al. |
| 4,797,263 A | 1/1989 | Oza |
| 4,863,700 A | 9/1989 | Ten Eyck |
| 4,865,818 A | 9/1989 | Merry et al. |
| 4,927,608 A | 5/1990 | Wörner et al. |
| 4,929,429 A | 5/1990 | Merry |
| 4,985,212 A | 1/1991 | Kawakami et al. |
| 4,999,168 A | 3/1991 | Ten Eyck |
| 5,008,086 A | 4/1991 | Merry |
| 5,032,441 A | 7/1991 | Ten Eyck et al. |
| 5,073,432 A | 12/1991 | Horikawa et al. |
| 5,079,280 A | 1/1992 | Yang et al. |
| 5,094,073 A | 3/1992 | Wörner et al. |
| 5,094,074 A | 3/1992 | Nishizawa et al. |
| 5,119,551 A | 6/1992 | Abbott |
| 5,145,811 A | 9/1992 | Lintz et al. |
| 5,151,253 A | 9/1992 | Merry et al. |
| 5,188,779 A | 2/1993 | Horikawa et al. |
| 5,242,871 A | 9/1993 | Hashimoto et al. |
| 5,250,269 A | 10/1993 | Langer |
| 5,254,410 A | 10/1993 | Langer et al. |
| 5,258,216 A | 11/1993 | Von Bonin et al. |
| 5,290,522 A | 3/1994 | Rogers et al. |
| 5,332,609 A | 7/1994 | Corn |
| 5,332,699 A | 7/1994 | Olds et al. |
| 5,340,643 A | 8/1994 | Ou et al. |
| 5,346,868 A | 9/1994 | Eschner |
| 5,376,341 A | 12/1994 | Gulati |
| 5,380,580 A | 1/1995 | Rogers et al. |
| 5,384,188 A | 1/1995 | Lebold et al. |
| 5,389,716 A | 2/1995 | Graves |
| 5,391,530 A | 2/1995 | Nowitzki et al. |
| 5,453,116 A | 9/1995 | Fischer et al. |
| 5,482,686 A | 1/1996 | Lebold et al. |
| 5,488,826 A | 2/1996 | Paas |
| 5,523,059 A | 6/1996 | Langer |
| 5,580,532 A | 12/1996 | Robinson et al. |
| 5,585,312 A | 12/1996 | Ten Eyck et al. |
| 5,629,067 A | 5/1997 | Wataru et al. |
| 5,666,726 A | 9/1997 | Robinson et al. |
| 5,714,421 A | 2/1998 | Olds et al. |
| 5,736,109 A | 4/1998 | Howorth et al. |
| 5,811,063 A | 9/1998 | Robinson et al. |
| 5,811,360 A | 9/1998 | Jubb |
| 5,821,183 A | 10/1998 | Jubb |
| 5,853,675 A | 12/1998 | Howorth |
| 5,862,590 A | 1/1999 | Sakashita et al. |
| 5,869,010 A | 2/1999 | Langer |
| 5,874,375 A | 2/1999 | Zoitos et al. |
| 5,882,608 A | 3/1999 | Sanocki et al. |
| 5,914,187 A | 6/1999 | Naruse et al. |
| 5,928,975 A | 7/1999 | Jubb |
| 5,955,177 A | 9/1999 | Sanocki et al. |
| 5,955,389 A | 9/1999 | Jubb et al. |
| 6,000,131 A | 12/1999 | Schmitt |
| 6,025,288 A | 2/2000 | Zoitos et al. |
| 6,030,910 A | 2/2000 | Zoitos et al. |
| 6,051,193 A | 4/2000 | Langer et al. |
| 6,101,714 A | 8/2000 | Schmitt |
| 6,158,120 A | 12/2000 | Foster et al. |
| 6,162,404 A | 12/2000 | Tojo et al. |
| 6,183,852 B1 | 2/2001 | Rorabaugh et al. |
| 6,231,818 B1 | 5/2001 | TenEyck |
| 6,317,976 B1 | 11/2001 | Aranda et al. |
| 6,468,932 B1 | 10/2002 | Robin et al. |
| 6,589,488 B1 | 7/2003 | Eyhorn |
| 6,669,751 B1 | 12/2003 | Ohno et al. |
| 6,726,884 B1 | 4/2004 | Dillon et al. |
| 6,737,146 B2 | 5/2004 | Schierz et al. |
| 6,756,107 B1 | 6/2004 | Schierz et al. |
| 6,855,298 B2 | 2/2005 | TenEyck |
| 6,861,381 B1 | 3/2005 | Jubb et al. |
| 6,923,942 B1 | 8/2005 | Shirk et al. |
| 6,953,757 B2 | 10/2005 | Zoitos et al. |
| 7,033,412 B2 | 4/2006 | Kumar et al. |
| 7,112,233 B2 | 9/2006 | Ohno et al. |
| 7,153,796 B2 | 12/2006 | Jubb et al. |
| 7,166,555 B2 | 1/2007 | Shustack et al. |
| 7,259,118 B2 | 8/2007 | Jubb et al. |
| 7,261,864 B2 | 8/2007 | Watanabe |
| 7,387,822 B2 | 6/2008 | Dinwoodie |
| 7,550,118 B2 | 6/2009 | Merry |
| 7,670,664 B2 * | 3/2010 | Watanabe et al. ............ 428/116 |
| 7,820,117 B2 | 10/2010 | Peisert et al. |
| 7,887,917 B2 | 2/2011 | Zoitos et al. |
| 7,971,357 B2 | 7/2011 | Ten Eyck et al. |
| 2001/0036427 A1 | 11/2001 | Yamada et al. |
| 2002/0025904 A1 | 2/2002 | Goto et al. |
| 2002/0127154 A1 | 9/2002 | Foster et al. |
| 2003/0049180 A1 | 3/2003 | Fukushima |
| 2003/0185724 A1 | 10/2003 | Anji et al. |
| 2004/0052694 A1 | 3/2004 | Nishikawa et al. |
| 2004/0234436 A1 | 11/2004 | Howorth |
| 2005/0050845 A1 | 3/2005 | Masukawa et al. |
| 2005/0109023 A1 | 5/2005 | Kudo et al. |
| 2005/0159308 A1 | 7/2005 | Bliss et al. |
| 2005/0272602 A1 | 12/2005 | Ninomiya |
| 2006/0021310 A1 | 2/2006 | Ohno et al. |
| 2006/0101747 A1 | 5/2006 | Masukawa et al. |
| 2006/0121240 A1 | 6/2006 | Hirai et al. |
| 2006/0153746 A1 | 7/2006 | Merry et al. |
| 2006/0154040 A1 | 7/2006 | Merry |
| 2006/0216466 A1 * | 9/2006 | Yoshida ..................... 428/116 |
| 2006/0272306 A1 | 12/2006 | Kirk et al. |
| 2006/0278323 A1 | 12/2006 | Eguchi |
| 2006/0292332 A1 | 12/2006 | Ohno et al. |
| 2006/0292333 A1 | 12/2006 | Ohno et al. |
| 2006/0292334 A1 | 12/2006 | Ohno et al. |
| 2006/0292335 A1 | 12/2006 | Ohno et al. |
| 2006/0292336 A1 | 12/2006 | Ohno et al. |
| 2006/0292337 A1 | 12/2006 | Ohno et al. |
| 2006/0292338 A1 | 12/2006 | Ohno et al. |
| 2006/0292339 A1 | 12/2006 | Ohno et al. |
| 2007/0020454 A1 | 1/2007 | Zoitos et al. |
| 2007/0065349 A1 | 3/2007 | Merry |
| 2007/0207069 A1 | 9/2007 | Kariya et al. |
| 2007/0277489 A1 | 12/2007 | Gadkaree et al. |
| 2008/0253939 A1 | 10/2008 | Hornback |
| 2009/0041975 A1 | 2/2009 | Kodama et al. |
| 2009/0060800 A1 | 3/2009 | Fernandez |
| 2009/0060802 A1 | 3/2009 | Beauharnois |
| 2009/0114097 A1 | 5/2009 | Saiki |
| 2010/0207298 A1 | 8/2010 | Kunze et al. |
| 2010/0209306 A1 | 8/2010 | Kunze et al. |

FOREIGN PATENT DOCUMENTS

| | | |
|---|---|---|
| EP | 0 319 299 A2 | 6/1989 |
| EP | 0 508 751 A1 | 10/1992 |
| EP | 0 551 532 A1 | 7/1993 |
| EP | 0 643 204 A2 | 3/1995 |
| EP | 0 765 993 A1 | 4/1997 |
| EP | 0 803 643 A1 | 10/1997 |
| EP | 0 973 697 B1 | 7/2000 |
| EP | 1 495 807 A1 | 1/2005 |

(56) References Cited

FOREIGN PATENT DOCUMENTS

| | | | |
|---|---|---|---|
| EP | 1 696 110 A1 | 8/2006 | |
| EP | 1 905 895 A1 | 4/2008 | |
| EP | 1 931 862 B1 | 6/2008 | |
| EP | 1 950 035 A1 | 7/2008 | |
| GB | 1 438 762 A | 6/1976 | |
| GB | 1 513 808 A | 6/1978 | |
| GB | 2 200 129 A | 7/1988 | |
| JP | 4-83773 A | 3/1992 | |
| JP | 6-272549 | 9/1994 | |
| JP | 7-286514 | 10/1995 | |
| WO | WO 91/11498 A1 | 8/1991 | |
| WO | WO 97/32118 A1 | 9/1997 | |
| WO | WO 99/23370 A1 | 5/1999 | |
| WO | WO 99/46028 A1 | 9/1999 | |
| WO | WO 00/75496 A1 | 4/2000 | |
| WO | WO 01/65008 A1 | 9/2001 | |
| WO | WO 01/83956 A1 | 11/2001 | |
| WO | WO 02/33233 A1 | 4/2002 | |
| WO | WO 02/053511 A1 | 7/2002 | |
| WO | WO 03/000414 A1 | 1/2003 | |
| WO | WO 03/031368 A2 | 4/2003 | |
| WO | WO 2007/005836 | 1/2007 | |
| WO | WO 2007-125667 * | 7/2007 | ............... B32B 3/12 |
| WO | WO 2007/116665 A1 | 10/2007 | |
| WO | WO 2008/103525 A2 | 8/2008 | |
| WO | WO 2008/154078 A1 | 12/2008 | |
| WO | WO 2008/156942 A1 | 12/2008 | |

OTHER PUBLICATIONS

Maret, Gulati, Lambert & Zink. Systems Durability of a Ceramic Racetrack Converter. International Fuels and Lubricants Meeting, Toronto, Canada, Oct. 7-10, 1991.
English language abstract of DE 19858025; Publication Date: Jun. 21, 2000; Applicant: Aslgawo GmbH.
Tosa Shin'Ichi, et al., "The Development of Converter Canning Technology for Thin Wall Substrate." Honda R&D Tech. Rev., vol. 12, No. 1, pp. 175-182, Japan (2000).
Product Brochure—"There's More to it Than You Think. HDK—Pyrogenic Silica", Wacker Silicones, 6173/10.05/e, Oct. 2005.
Technical Data Sheet—"HDK N20 Pyrogenic Silica", Wacker Silicones, Version 1.0, Jun. 12, 2008.
PCT/US2009/006427, International Search Report, Jul. 26, 2010.
PCT/US2009/006427, Written Opinion of the International Searching Authority, Jul. 26, 2010.
Abstract of Sato, S., et al., "Structural and catalytic properties of silica-coated alumina", Bulletin of the Chemical Society of Japan, 2006, pp. 649-655, vol. 79, No. 4.
Office Action from China Patent Office issued Jun. 26, 2012 for corresponding Chinese Patent Application No. 200980150599.4.

* cited by examiner

CERAMIC HONEYCOMB STRUCTURE SKIN COATING

This application is a continuation of U.S. Ser. No. 13/542,325, filed on Jul. 5, 2012, which is a continuation of U.S. Ser. No. 12/633,167, filed on Dec. 8, 2009, now U.S. Pat. No. 8,263,512 B2, which claims the benefit of the filing date, under 35 U.S.C. §119(e), of U.S. Provisional Application for Patent Ser. No. 61/122,583, filed on Dec. 15, 2008, all of which are incorporated herein by reference as if fully written out below.

BACKGROUND

Ceramic honeycomb structures, such as those used as catalytic converters and diesel particulate filters ("DPFs"), are manufactured by various processes. Generally, the honeycomb structures are manufactured by extrusion, resulting in a multiplicity of through holes or passages which are separated by the walls of the honeycomb structure. Each passage is sealed at either the inlet or outlet end of the structure and the structure is fired at a high temperature. Adjacent passages are capped alternatively, forming a checkerboard pattern, so that a fluid passing into the structure will be forced to pass through a wall of the structure before passing out of the structure. In this manner, the fluid passing through the structure can either be contacted by a catalyst or particles in the fluid can be filtered, as the fluid passes through the walls of the honeycomb structure.

The catalysts which are used with those honeycomb structures in catalytic converters require high temperatures and high porosity of the honeycomb walls in order to ensure an efficient rate of catalysis. It is therefore necessary that the structure be able to heat up quickly in order to effectively clean exhaust from an engine which has just been started. Those structures which are used as DPFs require that there be low pressure loss as the exhaust passes through the filter, since DPFs are usually utilized in circumstances where the exhaust will pass through the DPF, and then through an independent catalytic converter.

Therefore, it is desired that such honeycomb structures, while being able to withstand the extreme temperatures associated with combustion engines, have a low heat capacity and that the pressure loss through the structure is minimized. In order to achieve these properties, a high porosity and low wall thickness are desirable. However, high porosity and low wall thickness result in low mechanical strength, which results in various problems during production.

In an attempt to rectify these problems, it is now the state of the art to enclose the honeycomb structure within a ceramic paste or mat which will lend the structure increased mechanical strength, protection from vibration, and seal the structure so that, when it is canned, exhaust gases will not pass between the structure and its housing.

It has also been proposed to manufacture multiple smaller honeycomb structures and bond them together using a ceramic adhesive material to create a single structure, which will still require the use of a skin coating around the exterior of the structure to ensure uniformity of the exterior surface. These single honeycomb structures are able to support their own weight more effectively, and the adhesive material lends the structure increased mechanical strength once the monolith is fired.

Whether the monolith is assembled from smaller honeycomb structures or is extruded as a single unit, the exterior of the structure may require machining after the firing step to meet the tight specification tolerances for roundness and actual diameter in the shape of the structure, and to create a surface which will adhere to the skin coating. In some instances, this machining will result in partial honeycomb cells being exposed, which will need to be filled by the skin coating, usually a ceramic paste in these instances.

Skin coatings comprising ceramic pastes are desirable because they can be made of materials similar to that of the ceramic honeycomb structure, resulting in similar heat capacities, and they can be used to perfect the shape of the structure. Mats can be used in conjunction with pastes to provide addition protection from vibration damage to the structure while it is in use. Desirably, the pastes will resist cracking, peeling, and degradation by absorption of acidic catalytic substances. None of the previously proposed ceramic paste materials have sufficiently achieved all of these goals.

DETAILED DESCRIPTION

Figure 1:
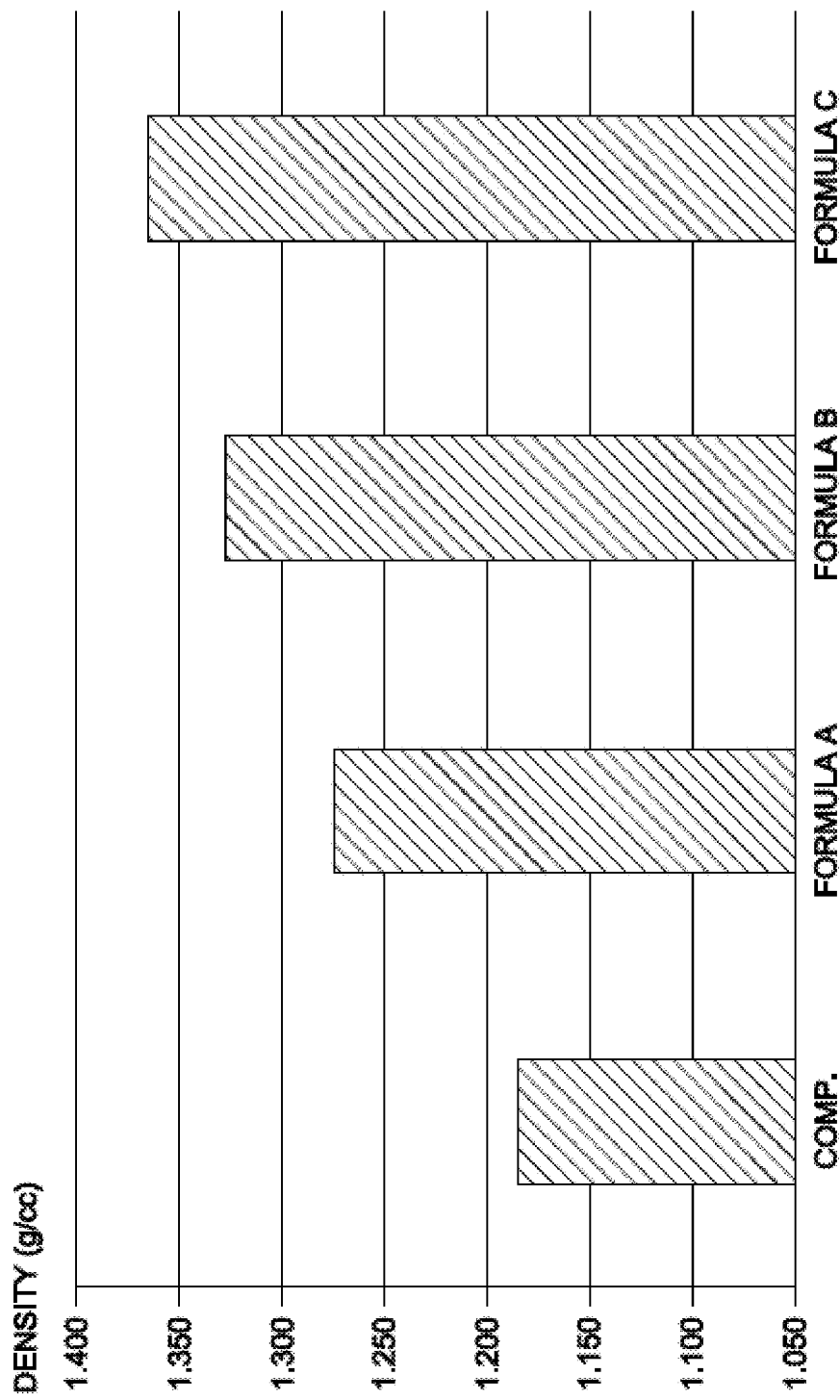
FIG. 1 is a graphical representation of the green density of examples of the subject skin coating formulation compared to a commercial ceramic paste skin coating product.

We have now shown that addition of a secondary fiber can minimize cracking of the skin coating during the drying and firing stages of manufacture of a ceramic honeycomb structure. These secondary fibers need not necessarily be high temperature resistant fibers; fibers that are not resistant to particularly high temperatures function very well in preventing cracking during the drying and firing stages of the skin coating. The term "honeycomb structure" includes any porous ceramic structure utilized in exhaust gas treatment devices, such as catalytic converters, diesel particulate filters, selective catalyst reduction units, $NO_x$ traps, and the like.

Further, we have shown that, during the drying stage, a non-absorbent, hard, dense, eggshell-like surface forms on the surface of the skin coating as herein described. While not being limited by theory, it is believed that this surface is formed by the migration of the silica species during the drying stage. This surface prevents the acidic catalyst coating from being absorbed into the skin coating. Preventing absorption is desirable because, as described above, the skin coating may be degraded by exposure to the acidic catalyst coating. Preventing absorption also allows for the use of a lesser quantity of catalyst coating, reducing overall production costs.

Provided is a ceramic honeycomb structure skin coating and a method of producing a ceramic honeycomb structure skin coating which provides a hardshell, acid- and alkali-resistant, chip-resistant ceramic honeycomb structure skin coating having high strength, and which resists pollution control catalysts being absorbed into the skin coating.

In one embodiment, the ceramic skin coating material for porous ceramic (e.g., honeycomb) substrates comprises refractory ceramic fiber or biosoluble inorganic fiber; a viscosity modifier; a colloidal inorganic oxide; optionally, an inorganic binder; optionally, an inorganic particulate; and, optionally, a secondary inorganic fiber.

The refractory ceramic fibers or biosoluble inorganic fibers may comprise at least one of aluminosilicate fibers, alkaline earth silicate fibers, or calcium aluminate fibers. The refractory ceramic fiber (RCF) may include but not be limited to aluminosilicate fibers. The alkaline earth silicate fibers may include but not be limited to magnesium silicate fibers or calcium magnesium silicate fibers.

These primary fibers (RCF or biosoluble inorganic fibers) may be utilized with various degrees of shot content, ranging from "as is" (as produced) to high index and air classified fibers, in which substantially all shot has been removed. In certain embodiments, the primary fiber may be ball milled.

The viscosity modifier may include but not be limited to alkyl cellulose polymers, such as methyl cellulose (MC) and/or its derivatives, such as hydroxypropyl methyl cellulose (HPMC), hydroxyethyl methyl cellulose (HEMC), hydroxyethylcellulose (HEC), carboxymethylcellulose (CMC), hydroxyethylcarboxymethylcellulose (HECMC), or carboxymethylhydroxyethylcellulose (CMHEC), or mixtures thereof. In certain embodiments the viscosity of the viscosity modifier is within the range of about 20 cps to about 2000 cps.

Other non-limiting examples of viscosity modifiers include polyalkylene oxides, certain polysaccharides, polyacrylic acids, polyacrylamides, and mixtures thereof. The polyalkylene oxide may include, but not be limited to, polyethylene oxides having molecular weights ranging from about 1 million to about 4 million g/mol. Illustrative examples of suitable polysaccharides include welan gum, diutan gum, xanthan gum and mixtures thereof. The polyacrylic acid may have a molecular weight of about 500,000 g/mol or greater.

The colloidal inorganic oxide may be colloidal silica, colloidal alumina, colloidal zirconia or mixtures thereof. Colloidal silica, such as those available from Nalco Chemical Company, are stable dispersions of nanometer size silica particles in water or other liquid medium. Colloidal silica particle sizes may range from about four to about 100 nanometers in diameter. The colloidal silica may be stabilized, such as with sodium or ammonium ions, and may have a pH range of about 2 to about 12.

The inorganic particulate may include, but not be limited to, at least one of alumina, cordierite (such as cordierite grog), mullite, titania, aluminum titanate, or silicon carbide. The inorganic particulate may be selected to include at least one component which has a thermal expansion coefficient which is compatible with the thermal expansion coefficient of the ceramic honeycomb substrate to which the skin coating is to be applied. Inorganic particulate particle sizes may be about 300 micron or less, in certain embodiments less than about 100 microns.

The inorganic binder may comprise clay. The clay may be calcined or uncalcined, and may include but not be limited to attapulgite, ball clay, bentonite, hectorite, kaolininte, kyanite, montmorillonite, palygorskite, saponite, sepiolite, sillimanite, or combinations thereof. Inorganic binder particle sizes may be about 150 microns or less, in certain embodiments less than about 45 microns.

The secondary inorganic fibers may include but not be limited to glass fibers, leached silica fibers, high alumina fibers, mullite fibers, magnesium aluminosilicate fibers, S-2 glass fibers, E-glass fibers, or fine (sub-micron) diameter alumina-silicate fibers (HSA) and mixtures thereof.

In addition to the secondary inorganic fibers, organic binder fibers may optionally be included in the skin coating formulation. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof. These fibers may be used in amounts ranging from 0 to about 10 percent by weight, based upon 100 percent by weight of the total composition.

Other organic binders or resins may be optionally included in the skin coating formulation. Examples of suitable organic binders or resins include, but are not limited to, aqueous based latexes of acrylics, styrene-butadiene, vinylpyridine, acrylonitrile, vinyl chloride, polyurethane and the like. Silicone latexes are also suitable. Other resins include low temperature, flexible thermosetting resins such as unsaturated polyesters, epoxy resins and polyvinyl esters (such as polyvinylacetate or polyvinylbutyrate latexes). Up to about 10 percent by weight organic binder or resins may be employed. Solvents for the binders, if needed, can include water or a suitable organic solvent, such as acetone, for the binder utilized. Solution strength of the binder in the solvent (if used) can be determined by conventional methods based on the binder loading desired and the workability of the binder system (viscosity, solids content, etc.).

Refractory ceramic fiber typically substantially comprises alumina and silica, and typically contain from about 45 to about 60 percent by weight alumina and from about 40 to about 55 percent by weight silica. RCF fiber length is typically less than about 5 mm, and their average fiber diameter may range from about 0.5 µm to about 10.5 µm. FIBERFRAX® refractory aluminosilicate ceramic fibers (RCF), are available from Unifrax I LLC, Niagara Falls, N.Y.

The term "biosoluble inorganic fiber" refers to fibers that are substantially decomposable in a physiological medium or in a simulated physiological medium such as simulated lung fluid, saline solutions, buffered saline solutions, or the like. The solubility of the fibers may be evaluated by measuring the solubility of the fibers in a simulated physiological medium as a function of time. Biosolubility can also be estimated by observing the effects of direct implantation of the fibers in test animals or by the examination of animals or humans that have been exposed to fibers, i.e. biopersistence. A method for measuring the biosolubility of the fibers in physiological media is disclosed in U.S. Pat. No. 5,874,375 assigned to Unifrax I LLC.

Another approach to estimating the biosolubility of fibers is based on the composition of the fibers. For example, Germany classifies respirable inorganic oxide fibers based on a compositional index (KI value). The KI value is calculated by a summation of the weight percentages of alkaline and alkaline-earth oxides and subtraction of two times the weight percent of aluminum oxide in inorganic oxide fibers. Inorganic fibers that are biosoluble typically have a KI value of about 40 or greater.

Without limitation, suitable examples of biosoluble inorganic fiber that can be used to prepare the present skin coating material include those biosoluble inorganic fibers disclosed in U.S. Pat. Nos. 6,953,757; 6,030,910; 6,025,288; 5,874,375; 5,585,312; 5,332,699; 5,714,421; 7,259,118; 7,153,796; 6,861,381; 5,955,389; 5,928,975; 5,821,183; and 5,811,360, each of which are incorporated herein by reference.

The biosoluble alkaline earth silicate fiber may comprise the fiberization product of a mixture of oxides of magnesium and silica, commonly referred to as magnesium-silicate fibers. The magnesium-silicate fibers generally comprise the fiberization product of about 60 to about 90 weight percent silica, from greater than 0 to about 35 weight percent magnesia and 5 weight percent or less impurities. According to certain embodiments, the alkaline earth silicate fibers comprise the fiberization product of about 65 to about 86 weight percent silica, about 14 to about 35 weight percent magnesia, 0 to about 7 weight percent zirconia and 5 weight percent or less impurities. According to other embodiments, the alkaline earth silicate fibers comprise the fiberization product of about 70 to about 86 weight percent silica, about 14 to about 30 weight percent magnesia, and 5 weight percent or less impurities.

Illustrative examples of the biosoluble inorganic fiber include, but are not limited to, ISOFRAX® alkaline earth silicate fibers, having an average diameter of between about 0.6 microns and about 2.6 microns, available from Unifrax I LLC, Niagara Falls, N.Y. Commercially available ISOFRAX® fibers generally comprise the fiberization product of about 70 to about 80 weight percent silica, about 18 to about 27 weight percent magnesia and 4 weight percent or less impurities.

Alternatively or additionally, the biosoluble alkaline earth silicate fiber may comprise the fiberization product of a mixture of oxides of calcium, magnesium and silica. These fibers are commonly referred to as calcia-magnesia-silicate fibers. The calcia-magnesia-silicate fibers generally comprise the fiberization product of about 45 to about 90 weight percent silica, from greater than 0 to about 45 weight percent calcia, from greater than 0 to about 35 weight percent magnesia, and 10 weight percent or less impurities.

Suitable calcia-magnesia-silicate fibers are commercially available from Unifrax I LLC (Niagara Falls, N.Y.) under the registered trademark INSULFRAX. INSULFRAX® fibers generally comprise the fiberization product of about 61 to about 67 weight percent silica, from about 27 to about 33 weight percent calcia, and from about 2 to about 7 weight percent magnesia. Other commercially available calcia-magnesia-silicate fibers comprise about 60 to about 70 weight percent silica, from about 25 to about 35 weight percent calcia, from about 4 to about 7 weight percent magnesia, and optionally trace amounts of alumina; or, about 60 to about 70 weight percent silica, from about 16 to about 22 weight percent calcia, from about 12 to about 19 weight percent magnesia, and optionally trace amounts of alumina.

Biosoluble calcium aluminate fibers are disclosed in U.S. Pat. No. 5,346,868, U.S. Patent Publication No. 2007-0020454 A1, and International Patent Publication No. WO/2007/005836, which are incorporated herein by reference.

With respect to the secondary fibers, other alumina/silica ceramic fibers, such as high alumina or mullite ceramic fibers, may be made by sol gel processing, and usually contain more than 50 percent alumina. An example is FIBERMAX® fibers, available from Unifrax I LLC of Niagara Falls, N.Y. Magnesia/alumina/silicate fiber such as S2-GLASS, are commercially available from Owens Corning, Toledo, Ohio. S2-GLASS fibers typically contain from about 64 to about 66 percent silica, from about 24 to about 25 percent alumina, and from about 9 to about 10 percent magnesia.

Leached silica fibers may be leached in any manner and using any techniques known in the art. Generally, leaching may be accomplished by subjecting glass fibers to an acid solution or other solution suitable for extracting the non-siliceous oxides and other components from the fibers. A detailed description and process for making leached glass fibers high in silica content is contained in U.S. Pat. No. 2,624,658, the entire disclosure of which is incorporated herein by reference. Another process for making leached glass fibers high in silica content is disclosed in European Patent Application Publication No. 0973697.

Leached glass fibers are available under the trademark BELCOTEX from BelChem Fiber Materials GmbH, Germany, under the registered trademark REFRASIL from Hitco Carbon Composites, Inc. of Gardena Calif., and under the designation PS-23(R) from Polotsk-Steklovolokno, Republic of Belarus.

In another embodiment, a method of producing a porous ceramic (honeycomb) structure skin coating is provided comprising forming a mixture of: ceramic fibers or biosoluble inorganic fibers; a viscosity modifier; a colloidal inorganic oxide; optionally, an inorganic binder; optionally an inorganic particulate; and optionally secondary inorganic fibers.

In one embodiment, the dry ingredients are combined in one part, and separately the wet ingredients (colloidal inorganic oxide and water) are combined in a second part, and then both parts are mixed together. In another embodiment, the dry ingredients may be added to the wet ingredients in any order, and mixed. The skin coating material may be dried, for example, at about 50° to about 10° C.° for about two hour, or until completely dry. The dried skin coating material may be fired at about 500-1100° C. for about 1 to about 5 hours, optionally with a heating and cooling rate of about 100° C./hr or less.

In the production of an exhaust gas treatment device, after the skin-coated ceramic honeycomb structure is fired, the honeycomb may be soaked in a catalyst containing acidic or basic solution or dispersion, and subsequently dried and re-fired.

In certain embodiments, a skin coating material for porous ceramic (honeycomb) substrates is provided, comprising: refractory ceramic fiber or biosoluble inorganic fiber; a viscosity modifier; a colloidal inorganic oxide; an inorganic binder; an inorganic particulate; and, a secondary inorganic fiber.

EXAMPLES

Examples of various subject skin coating formulations (Examples A, B and C) are set forth in Table 1 below. These were tested in comparison to a commercial ceramic paste product that is used as a DPF skin coating formulation.

TABLE 1

| Ingredient | Ex. A | % | Ex. B | % | Ex. C | % |
|---|---|---|---|---|---|---|
| Fiber - RCF QF grade (Ball milled) | 0 | 0.00% | 200 | 38.76% | 100 | 20.41% |
| Fiber - RCF Air Classified | 100 | 21.21% | | 0.00% | | 0.00% |
| Cordierite | 140 | 29.69% | 140 | 25.74% | 140 | 28.57% |
| Calcined Kaolin | 20 | 4.24% | 10 | 1.84% | 20 | 4.08% |
| E-glass - ⅛" | 0 | 0.00% | | 0.00% | 3.5 | 0.71% |
| E-glass - 1/16" | | 0.00% | 2.5 | 0.46% | | 0.00% |
| Methyl Cellulose | 1.5 | 0.32% | 1.5 | 0.28% | 1.5 | 0.31% |
| Colloidal silica | 90 | 7.64% | 80 | 5.88% | 125 | 10.20% |
| Water | 120 | 36.90% | 110 | 29.04% | 100 | 35.71% |
| Mass Solids | 472 | 100.00% | 544 | 100.00% | 490 | 100.00% |

FIG. 1 represents the results of the testing of the green density of Examples A, B and C of the subject skin coating formulation compared to a commercial ceramic paste skin coating product. A flat plate of each of the skin coating materials was prepared to a thickness of a few millimeters. The volume and the weight of the plates were measured, and their densities calculated. Each of the subject skin coating formulations exhibited a higher green density than the commercial material control sample. Higher density provides strength and improved resistance to absorption of catalyst coating material.

Figure 2:
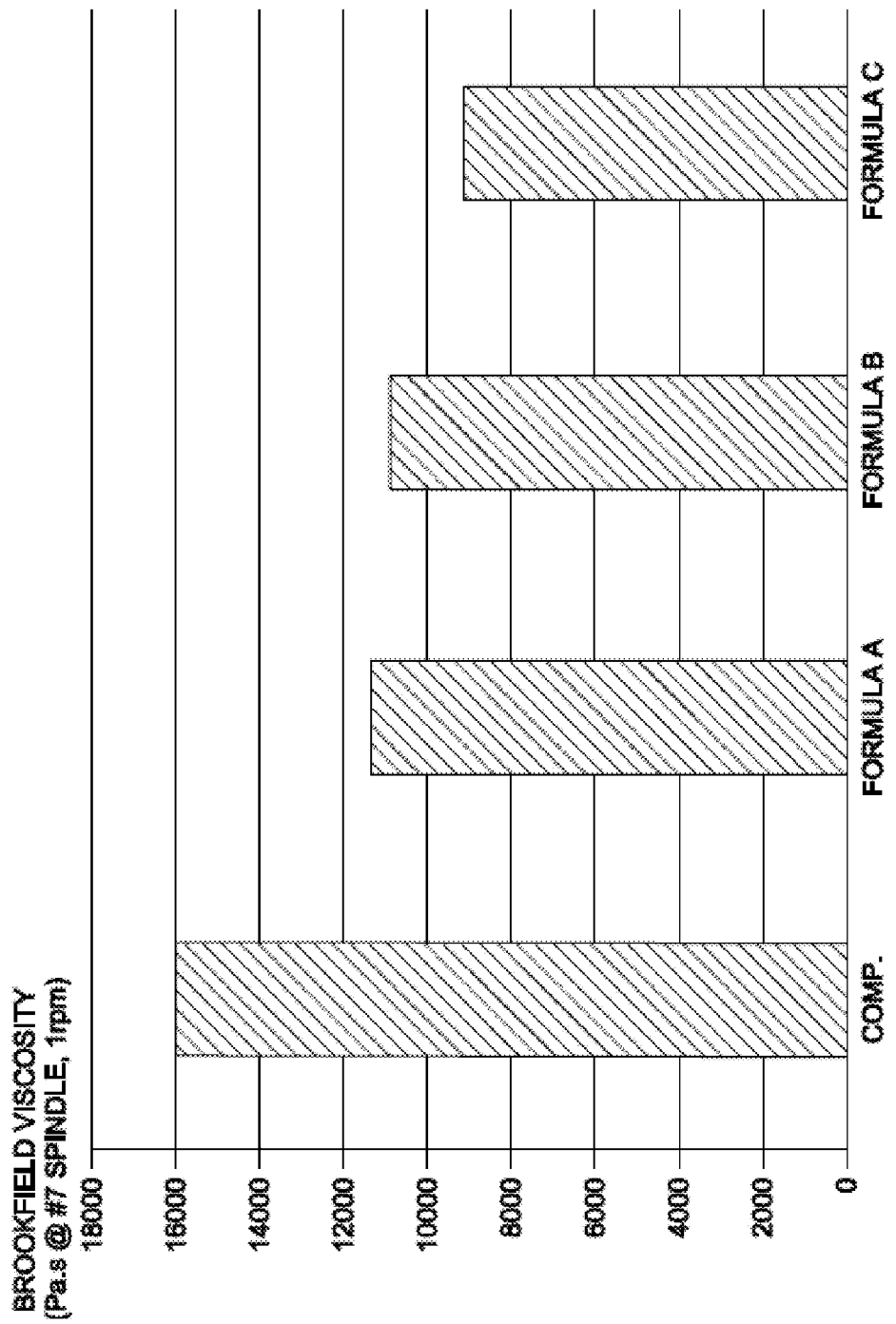
FIG. 2 is a graphical representation of the viscosity of examples of the subject skin coating formulation compared to a commercial ceramic paste skin coating product.

FIG. 2 represents the results of the testing of the viscosity of Examples A, B and C of the subject skin coating formulation compared to a commercial ceramic paste skin coating product. Viscosity was tested with a standard Brookfield viscometer, using a number 7 spindle at 1 rpm. As shown in the graph, the viscosity measurement of this material may have a variability of about +/−15%. Nevertheless, each of the exemplified subject skin coating formulations exhibited a lower viscosity than the commercial material control sample. Lower relative viscosity allows for easier pumping of the skin coating in formulation production and application to the substrate.

Figure 3:
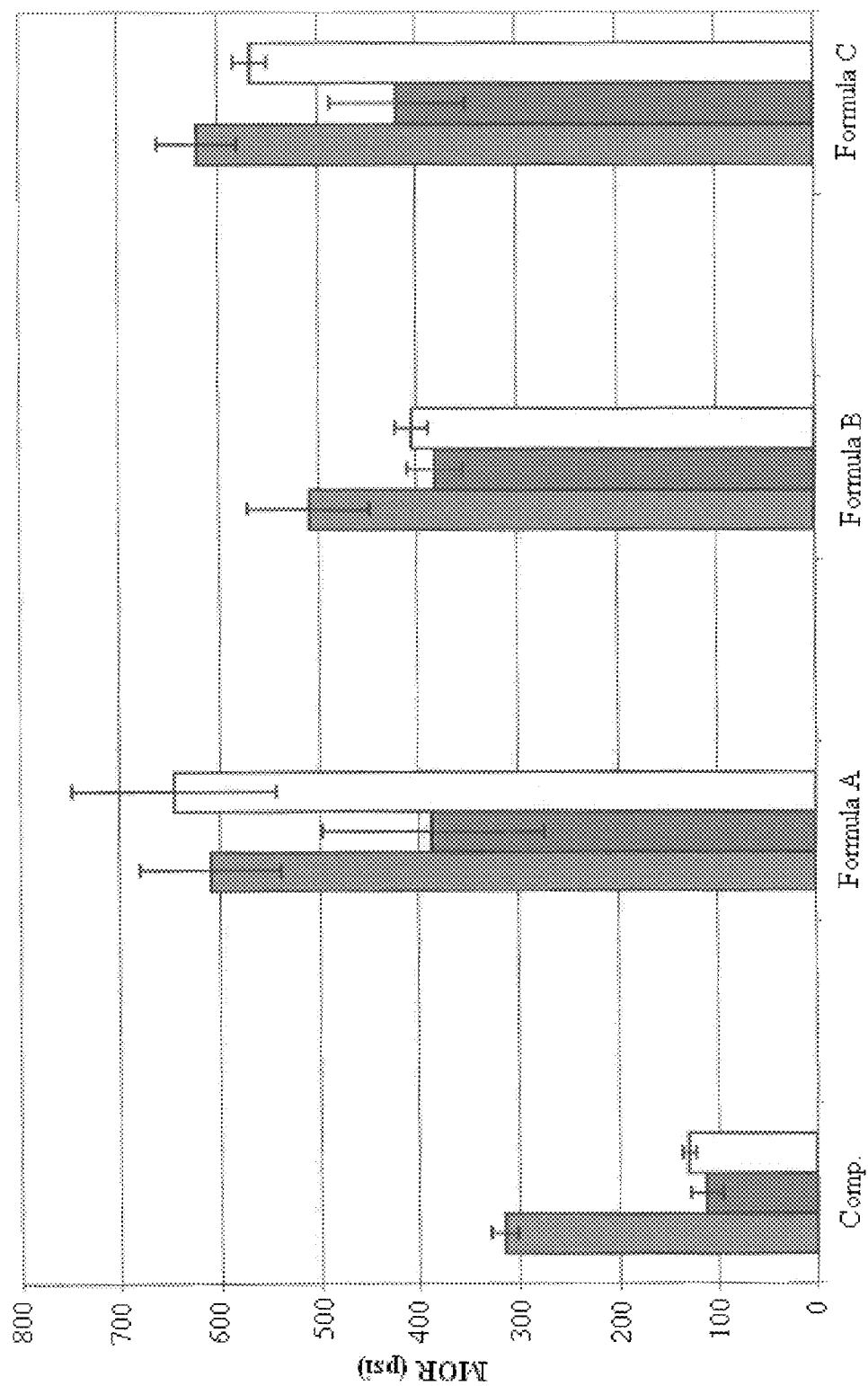
FIG. 3 is a graphical representation of the modulus of rupture under various conditions of examples of the subject skin coating compared to a commercial ceramic paste skin coating product.

FIG. 3 represents the results of the testing of the modulus of rupture (MOR) after treatment under various conditions of Examples A, B and C of the subject skin coating compared to a commercial ceramic paste skin coating product.

The samples from Examples A, B and C were heat treated to simulate skin coating application conditions and to simulate process conditions (acid/base treatment and heat treatment) during catalyst coating steps. A 4 point MOR test was performed according to ASTM C880. Specifically, referring to FIG. 3, the first respective bar of each sample shows the results of the MOR test when each sample was tested green, the second bar of each sample shows the results of the MOR test when each sample was tested after heat treatment, and the third bar of each sample shows the results of the MOR test after each sample was heat treated, acid/base (alkali) washed, and fired a second time.

Each of the subject skin coating formulations exhibited a higher modulus of rupture than the commercial material control sample, when tested green, after heat treatment, and after acid/base (alkali) treatment and a second heat treatment.

Overall MOR strength was higher for Examples A, B and C versus the comparative product even after heat treatment. No significant MOR strength drop was exhibited in Examples B and C formulations after heat treatment. Even when there was a drop, the percentage MOR drop was much lower for Examples A, B and C versus the comparative product following heat treatment.

Overall MOR strength was higher for Examples A, B and C versus the comparative product after acid and base soak followed by heat treatment. The percentage MOR strength drop was much lower for Examples A, B and C versus the comparative product after acid and base soak followed by heat treatment.

The thermal expansion coefficient, tested between 20 and 900° C., was measured for Examples B and C, at $36 \times 10^{-7}$ and $40 \times 10^{-7}$ respectively, compatible with commercial ceramic honeycomb substrates.

Components of the skin coating formulations may be present in the following amounts by weight: refractory ceramic fiber or biosoluble inorganic fiber, from about 15 to about 50%; viscosity modifier, from about 0.15 to about 0.5%; colloidal inorganic oxide, from about 2 to about 20%; inorganic particulate, from 0 to about 40%, inorganic binder (clay) from 0 to about 10%; secondary inorganic fiber, from 0 to about 10% and, water from about 25 to about 50%. In certain embodiments, the components may be present in the amounts by weight of: refractory ceramic fiber or biosoluble inorganic fiber, from about 20 to about 40%; viscosity modifier, from about 0.25 to about 0.4%; colloidal inorganic oxide, from about 5 to about 10.5%; inorganic particulate, from about 25 to about 37%, inorganic binder (clay) from about 1.5 to about 5%; secondary inorganic fiber, from about 1.15 to about 5% and, water from about 29 to about 47%.

Additional skin coating material formulations were successfully prepared and are reported in Tables 2-5, set out below.

TABLE 2

| Ingredient | Ex. D | % | Ex. E | % |
|---|---|---|---|---|
| Fiber - RCF QF grade |  | 0.00% | 52.75 | 13.98% |
| Fiber - RCF High Index | 52.75 | 12.12% |  | 0.00% |
| Cordierite | 146 | 33.54% | 140 | 37.11% |
| Bentonite clay | 12 | 2.76% | 12 | 3.18% |
| 1/8" glass fiber | 5 | 1.15% | 5 | 1.33% |
| Methyl Cellulose | 1.5 | 0.34% | 1.5 | 0.40% |
| Colloidal silica | 38 | 3.49% | 76 | 8.06% |
| Water | 180 | 46.59% | 90 | 35.94% |
| Mass Solids | 435 | 100.00% | 377 | 100.00% |

A 4 point MOR test was performed according to ASTM C880 for Examples D and E of the subject skin coating formulation as described above. The green MOR for Example D was 603 psi, and the acid/heat treated MOR was 606.5. The green MOR for Example E was 1147.9 psi, and the acid/heat treated MOR was 479.8.

TABLE 3

| Ingredient | Ex. F | % | Ex. G | % |
|---|---|---|---|---|
| Fiber - ISOFRAX ® (Ball milled) | 200 | 36.76% | 100 | 20.41% |
| Cordierite | 140 | 25.74% | 140 | 28.57% |
| Calcined Kaolin | 10 | 1.84% | 20 | 4.08% |
| E-glass - 1/8" | 0 | 0.00% | 3.5 | 0.71% |
| E-glass - 1/16" | 2.5 | 0.46% | 0 | 0.00% |
| Methyl Cellulose | 1.5 | 0.28% | 1.5 | 0.31% |
| Colloidal silica | 80 | 14.71% | 125 | 25.51% |
| Water | 110 | 20.22% | 100 | 20.41% |
| Mass Solids | 544 | 100.00% | 490 | 100.00% |

TABLE 4

| Ingredient | Ex. H | % | Ex. I | % | Ex. J | % | Ex. K | % | Ex. L | % |
|---|---|---|---|---|---|---|---|---|---|---|
| Fiber-RCF QF Grade | 80 | 20.59% | 80 | 20.65% | 53 | 14.70% | 53 | 14.76% |  | 0.00% |
| Fiber-RCF High Index |  | 0.00% |  | 0.00% |  | 0.00% |  | 0.00% | 52.75 | 12.12% |
| Cordierite | 140 | 36.04% | 140 | 36.13% | 140 | 38.83% | 140 | 39.00% | 146 | 33.54% |
| Volclay | 12 | 3.09% | 12 | 3.10% | 12 | 3.33% | 12 | 3.34% | 12 | 2.76% |
| HSA Fiber | 5 | 1.29% | 2 | 0.52% | 2 | 0.55% |  | 0.00% | 5 | 1.15% |
| E-glass Fiber |  | 0.00% | 2 | 0.52% | 2 | 0.55% |  | 0.00% |  | 0.00% |
| Silica Fiber |  | 0.00% |  | 0.00% |  | 0.00% | 2.5 | 0.70% |  | 0.00% |
| Methyl Cellulose | 1.5 | 0.39% | 1.5 | 0.39% | 1.5 | 0.42% | 1.5 | 0.42% | 1.5 | 0.34% |
| Colloidal Silica | 80 | 8.24% | 80 | 8.26% | 80 | 8.88% | 80 | 8.91% | 38 | 3.49% |
| Water | 70 | 30.37% | 70 | 30.45% | 70 | 32.73% | 70 | 32.87% | 180 | 46.59% |
| Mass Solids | 389 | 100.00% | 388 | 100.00% | 361 | 100.00% | 359 | 100.00% | 435 | 100.00% |

TABLE 5

| Ingredient | Ex. M | % | Ex. N | % | Ex. P | % | Ex. R | % | Ex. S | % |
|---|---|---|---|---|---|---|---|---|---|---|
| Fiber-ISOFRAX ® Ball Milled | 10 | 3.42% | 20 | 6.50% | 30 | 9.30% | 40 | 11.86% |  | 0.00% |
| Fiber-ISOFRAX ® High Index |  | 0.00% |  | 0.00% |  | 0.00% |  | 0.00% | 52.75 | 11.36% |
| Silcon Carbide | 146 | 49.91% | 146 | 47.48% | 146 | 45.27% | 146 | 43.26% | 140 | 30.16% |
| Volclay | 12 | 4.10% | 12 | 3.90% | 12 | 3.72% | 12 | 3.56% | 12 | 2.58% |
| E-Glass 1/8" fiber | 5 | 1.71% | 5 | 1.63% | 5 | 1.55% | 5 | 1.48% | 5 | 1.08% |
| Methyl Cellulose | 1.5 | 0.51% | 1.5 | 0.49% | 1.5 | 0.47% | 1.5 | 0.44% | 1.5 | 0.32% |
| Colloidal Silica - 1034a | 38 | 5.20% | 38 | 4.94% | 38 | 4.71% | 38 | 4.50% | 38 | 3.27% |
| Water | 80 | 35.15% | 85 | 35.06% | 90 | 34.98% | 95 | 34.90% | 215 | 51.22% |
| Total Mass | 293 | 100.00% | 308 | 100.00% | 323 | 100.00% | 338 | 100.00% | 470 | 100.00 |

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

We claim:

1. A skin coating material for porous ceramic substrates comprising:
   refractory ceramic fiber or biosoluble inorganic fiber;
   a viscosity modifier;
   a colloidal inorganic oxide;
   a secondary inorganic fiber comprising E-glass fiber;
   optionally, an inorganic binder; and
   optionally, an inorganic particulate.

2. The skin coating material of claim 1 comprising refractory ceramic fiber.

3. The skin coating material of claim 1 comprising biosoluble magnesia silicate fiber.

4. The skin coating material of claim 1 comprising a methyl cellulose viscosity modifier, colloidal silica, an inorganic binder, and cordierite particulate.

5. The skin coating material of claim 1, further comprising at least one of an organic binder fiber, an organic binder, or a resin.

6. The skin coating material of claim 1 comprising a methyl cellulose viscosity modifier, colloidal silica, an inorganic binder, and silicon carbide particulate.

7. The skin coating material of claim 6 wherein the inorganic binder comprises bentonite clay.

8. A method of producing a porous ceramic substrate skin coating, comprising forming a mixture of: refractory ceramic fibers or biosoluble inorganic fibers; a viscosity modifier; a colloidal inorganic oxide; a secondary inorganic fiber comprising E-glass fiber; optionally, an inorganic binder; and, optionally, an inorganic particulate.

9. The method of claim 8, wherein said forming a mixture comprises:
   forming a dry mixture of: refractory ceramic fibers or biosoluble inorganic fibers; a viscosity modifier; a secondary inorganic fiber comprising E-glass fiber; optionally, an inorganic binder; and optionally, an inorganic particulate;
   forming a wet mixture of a colloidal inorganic oxide and water; and
   mixing the dry mixture and the wet mixture.

10. The skin coating material of claim 1, wherein the biosoluble inorganic fibers comprise at least one of alkaline earth silicate fibers, or calcium aluminate fibers.

11. The skin coating material of claim 10, wherein the alkaline earth silicate fibers comprise at least one of magnesium silicate fibers or calcium magnesium silicate fibers.

12. The skin coating material of claim 1, wherein the inorganic particulate is present and comprises at least one of alumina, cordierite, mullite, titania, aluminum titanate, or silicon carbide.

13. The skin coating of claim 1, wherein the inorganic binder is present and comprises an uncalcined clay or a calcined clay.

14. The skin coating material of claim 13, wherein the clay comprises at least one of attapulgite, ball clay, bentonite, hectorite, kaolinite, kyanite, montmorillonite, palygorskite, saponite, sepiolite, sillimanite, or combinations thereof.

15. The skin coating material of claim 1, wherein the viscosity modifier comprises at least one of alkyl cellulose polymers, polyalkylene oxides, polysaccharides, polyacrylic acids, polyacrylamides, and mixtures thereof.

16. The skin coating material of claim 15, wherein the alkyl cellulose polymers comprises at least one of, methyl cellulose, hydroxypropyl methyl cellulose, hydroxyethyl methyl cellulose, hydroxyethyl cellulose, carboxy methyl cellulose, hydroxyethyl carboxymethylcellulose, or carboxymethylhydroxyethylcellulose, or mixtures thereof.

17. The skin coating material of claim 1, wherein the colloidal inorganic oxide comprises at least one of colloidal silica, colloidal alumina, colloidal zirconia or mixtures thereof.

* * * * *